(12) United States Patent
Li et al.

(10) Patent No.: US 10,742,889 B2
(45) Date of Patent: Aug. 11, 2020

(54) IMAGE PHOTOGRAPHING METHOD, IMAGE PHOTOGRAPHING APPARATUS, AND TERMINAL

(71) Applicant: Huawei Technologies Co., Ltd., Shenzhen (CN)

(72) Inventors: Lin Li, Shenzhen (CN); Wei Luo, Shanghai (CN); Lei Song, Shanghai (CN); Lintao Jiao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/736,613

(22) PCT Filed: Nov. 25, 2015

(86) PCT No.: PCT/CN2015/095557
§ 371 (c)(1),
(2) Date: Dec. 14, 2017

(87) PCT Pub. No.: WO2017/088127
PCT Pub. Date: Jun. 1, 2017

(65) Prior Publication Data
US 2018/0152611 A1    May 31, 2018

(51) Int. Cl.
*H04N 5/235*    (2006.01)
*H04N 5/232*    (2006.01)
(Continued)

(52) U.S. Cl.
CPC ....... *H04N 5/2351* (2013.01); *H04N 5/23241* (2013.01); *H04N 5/23245* (2013.01);
(Continued)

(58) Field of Classification Search
CPC .......... H04N 5/23241; H04N 5/23245; H04N 5/23293; H04N 5/232935; H04N 5/2351; H04N 5/347; H04N 9/0451
See application file for complete search history.

(56) References Cited

U.S. PATENT DOCUMENTS 7,697,049 B1    4/2010  Lavi
7,989,745 B2 *  8/2011  Suzuki ............... H04N 5/37457
                                              250/201.2
(Continued)

FOREIGN PATENT DOCUMENTS

CN    101146234 A    3/2008
CN    100542214 C    9/2009
(Continued)

OTHER PUBLICATIONS

Machine Translation and Abstract of Korean Publication No. KR20120140571, Dec. 31, 2012, 16 pages.
(Continued)

*Primary Examiner* — Ngoc Yen T Vu
(74) *Attorney, Agent, or Firm* — Conley Rose, P.C.

(57) ABSTRACT

A photographing method, a photographing apparatus, and a terminal, where the method includes receiving a camera turn-on instruction, previewing a preview image collected by the camera based on the received camera turn-on instruction, where in a preview state, an operation mode of an image sensor of the camera is an average pixel combination mode, and photographing the preview image when detecting that luminance of at least one pixel in the preview image is less than a preset condition, where when the preview image is being photographed, the operation mode of the image sensor of the camera is a sum pixel combination mode. In this way, luminance of a photographed image can be
(Continued)

increased, and a problem that an image cannot be photographed in low light can be resolved.

20 Claims, 3 Drawing Sheets

(51) Int. Cl.
*H04N 5/347* (2011.01)
*H04N 9/04* (2006.01)

(52) U.S. Cl.
CPC ... *H04N 5/23293* (2013.01); *H04N 5/232935* (2018.08); *H04N 5/347* (2013.01); *H04N 9/0451* (2018.08)

(56) References Cited

U.S. PATENT DOCUMENTS

| | | | |
|---|---|---|---|
| 8,106,965 B2* | 1/2012 | Shimizu | H04N 5/23212 348/234 |
| 8,558,915 B2* | 10/2013 | Morimoto | H04N 5/225 348/230.1 |
| 9,497,385 B2* | 11/2016 | Horii | H04N 5/225 |
| 9,648,245 B2* | 5/2017 | Lee | H04N 5/2353 |
| 9,652,822 B2* | 5/2017 | Sato | G06T 3/0093 |
| 2005/0190274 A1 | 9/2005 | Yoshikawa et al. | |
| 2009/0160969 A1* | 6/2009 | Kuroiwa | H04N 5/23293 348/223.1 |
| 2011/0267495 A1 | 11/2011 | Atkinson | |
| 2012/0327269 A1 | 12/2012 | Hwang et al. | |
| 2013/0329075 A1 | 12/2013 | Liang et al. | |
| 2016/0057348 A1 | 2/2016 | Liang et al. | |

FOREIGN PATENT DOCUMENTS

| | | |
|---|---|---|
| CN | 101778220 A | 7/2010 |
| CN | 102843513 A | 12/2012 |
| CN | 104427254 A | 3/2015 |
| CN | 104793742 A | 7/2015 |
| JP | 2006041862 A | 2/2006 |
| JP | 2011015205 A | 1/2011 |
| JP | 2011044902 A | 3/2011 |
| KR | 20120140571 A | 12/2012 |
| TW | 201404143 A | 1/2014 |
| WO | 2005039188 A1 | 4/2005 |

OTHER PUBLICATIONS

Foreign Communication From A Counterpart Application, Korean Application No. 10-2017-7027468, Korean Office Action dated May 10, 2018, 5 pages.

Foreign Communication From A Counterpart Application, Korean Application No. 10-2017-7027468, English Translation of Korean Office Action dated May 10, 2018, 4 pages.

Machine Translation and Abstract of Chinese Publication No. CN101778220, Jul. 14, 2010, 14 pages.

Machine Translation and Abstract of Chinese Publication No. CN104427254, Mar. 18, 2015, 26 pages.

Machine Translation and Abstract of Chinese Publication No. CN104793742, Jul. 22, 2015, 14 pages.

Foreign Communication From a Counterpart Application, PCT Application No. PCT/CN2015/095557, English Translation of International Search Report dated Aug. 25, 2016, 2 pages.

Foreign Communication From a Counterpart Application, European Application No. 15909039.8, Extended European Search Report dated Sep. 7, 2018, 9 pages.

Machine Translation and Abstract of Japanese Publication No. JP2006041862, Feb. 9, 2006, 28 pages.

Machine Translation and Abstract of Japanese Publication No. JP2011015205, Jan. 20, 2011, 32 pages.

Machine Translation and Abstract of Japanese Publication No. JP2011044902, Mar. 3, 2011, 21 pages.

Foreign Communication From a Counterpart Application, Japanese Application No. 2017-552873, Japanese Notice of Allowance dated Nov. 26, 2018, 3 pages.

Machine Translation and Abstract of Chinese Publication No. CN100542214, Sep. 16, 2009, 24 pages.

Machine Translation and Abstract of Chinese Publication No. CN101146234, Mar. 19, 2008, 8 pages.

Foreign Communication From A Counterpart Application, Chinese Application No. 201580048879.X, Chinese Office Action dated Mar. 20, 2019, 8 pages.

* cited by examiner

IMAGE PHOTOGRAPHING METHOD, IMAGE PHOTOGRAPHING APPARATUS, AND TERMINAL

CROSS-REFERENCE TO RELATED APPLICATION

This application is a U.S. National Stage of International Patent Application No. PCT/CN2015/095557 filed on Nov. 25, 2015, which is hereby incorporated by reference in its entirety.

TECHNICAL FIELD

Embodiments of the present disclosure relate to the field of photographing technologies, and in particular, to a photographing method, a photographing apparatus, and a terminal that are for a low light environment.

BACKGROUND

There is an ever-increasing requirement for photographing using a mobile phone. However, when a photographing environment is a low illumination scenario, for example, luminance of the environment is less than 30 lux, for example, in a cinema, a pub, or a KTV, if there is no other auxiliary equipment, because light in the environment is extremely low and there is a small amount of light admitted into a camera, a photographed image is dark, and a clear and distinguishable image cannot be photographed.

To resolve this problem, some manufacturers add a camera flash to a rear-facing camera of a mobile phone to improve a photographing effect in a low light environment. However, during photographing, the camera flash usually dazzles human eyes, and a case in which user eyes temporarily cannot clearly see an object appears. In addition, a soft light function is added to front-facing cameras of some mobile phones, and when photographing is performed, a front-facing soft light is turned on to increase luminance in an environment. However, the light is relatively dazzling after being turned on, and a case in which user experience is not ideal also appears. In addition, a manufacturer uses a light emitting diode (LED) fill-in light solution to instantly increase luminance of a screen when photographing is performed. A problem of this manner is that there is no effect on previewing, and as a distance between a user and a mobile phone changes, a problem such as face asymmetry, ineffective brightening, or overexposure is caused when photographing is performed.

SUMMARY

Embodiments of the present disclosure provide a photographing method, a photographing apparatus, and a terminal such that luminance of a photographed image can be increased, and a problem that an image cannot be photographed in low light can be resolved.

According to a first aspect, a photographing method is provided, where the method includes receiving a camera turn-on instruction, previewing a preview image collected by the camera based on the received camera turn-on instruction, where in a preview state, an operation mode of an image sensor of the camera is an average pixel combination mode, and photographing the preview image when detecting that luminance of at least one pixel in the preview image is less than a preset condition, where when the preview image is being photographed, the operation mode of the image sensor of the camera is a sum pixel combination mode. Image noise can be reduced using the average pixel combination mode to preview the preview image captured by the camera.

With reference to the first aspect, in a first possible implementation of the first aspect, photographing the preview image includes photographing the preview image to obtain at least one of a picture or a video. A photographed image may be a hybrid video, that is, an image including both a picture and a video.

With reference to the first possible implementation of the first aspect, in a second possible implementation of the first aspect, after photographing the preview image, the method further includes performing at least one of whitening, denoising, eye brightening, or face slimming on a photographed image. An image that meets user expectation can be obtained by performing denoising processing and beauty processing on the photographed image.

With reference to any one of the first aspect, or the first to the second possible implementations of the first aspect, in a third possible implementation of the first aspect, after photographing the preview image, the method further includes switching the operation mode of the image sensor of the camera to the average pixel combination mode. Next time when a user performs photographing, a preview image of less noise is conveniently obtained using the image sensor in the average pixel combination mode.

According to a second aspect, a photographing apparatus is provided, where the apparatus includes a receiving unit configured to receive a camera turn-on instruction, a preview unit configured to preview a preview image collected by the camera based on the camera turn-on instruction received by the receiving unit, where in a preview state, an operation mode of an image sensor of the camera is an average pixel combination mode, and a photographing unit configured to photograph the preview image when detecting that luminance of at least one pixel in the preview image is less than a preset condition, where when the preview image is being photographed, the operation mode of the image sensor of the camera is a sum pixel combination mode. Image noise can be reduced using the average pixel combination mode to preview the preview image captured by the camera.

With reference to the second aspect, in a first possible implementation of the second aspect, the photographing unit is further configured to photograph the preview image to obtain at least one of a picture or a video.

With reference to the first possible implementation of the second aspect, in a second possible implementation of the second aspect, the apparatus further includes a processing unit, and the processing unit is configured to perform at least one of whitening, denoising, eye brightening, or face slimming on a photographed image. An image that meets user expectation can be obtained by performing denoising processing and beauty processing on the photographed image.

With reference to any one of the second aspect, or the first to the second possible implementations of the second aspect, in a third possible implementation of the second aspect, the apparatus further includes a switching unit, and the switching unit is configured to switch the operation mode of the image sensor of the camera to the average pixel combination mode. Next time when a user performs photographing, a preview image of less noise is conveniently obtained using the image sensor in the average pixel combination mode.

According to a third aspect, a terminal is provided, where the terminal includes a processor, a display, and a camera, and operation modes of an image sensor of the camera include an average pixel combination mode and a sum pixel combination mode. Based on a received camera turn-on instruction, the display is configured to preview a preview image collected by the camera, where in a preview state, the operation mode of the image sensor of the camera is the average pixel combination mode. The processor is configured to analyze luminance of at least one pixel in the preview image in the preview state. The camera is configured to photograph the preview image when the processor determines that the luminance of the at least one pixel in the preview image is less than a preset condition, where when the preview image is being photographed, the operation mode of the image sensor of the camera is the sum pixel combination mode. Image noise can be reduced using the average pixel combination mode to preview the preview image captured by the camera.

With reference to the third aspect, in a first possible implementation of the third aspect, that the camera is configured to photograph the preview image includes that the camera is configured to photograph the preview image to obtain at least one of a picture or a video. A photographed image may be a hybrid video, that is, an image including both a picture and a video.

With reference to the first possible implementation of the third aspect, in a second possible implementation of the third aspect, the processor is further configured to perform at least one of whitening, denoising, eye brightening, or face slimming on a photographed image. An image that meets user expectation can be obtained by performing denoising process and beauty process on the photographed image.

According to a fourth aspect, a photographing method is provided, where the method includes receiving a camera turn-on instruction, previewing a preview image collected by the camera based on the received camera turn-on instruction, where in a preview state, an operation mode of an image sensor of the camera is an average pixel combination mode, and photographing the preview image when detecting that light sensitivity International Organization for Standardization (ISO) of the image sensor is greater than a preset value, where when the preview image is being photographed, the operation mode of the image sensor of the camera is a sum pixel combination mode.

According to a fifth aspect, a terminal is provided, where the terminal includes a processor, a display, and a camera, and operation modes of an image sensor of the camera include an average pixel combination mode and a sum pixel combination mode. Based on a received camera turn-on instruction, the display is configured to preview a preview image collected by the camera, where in a preview state, the operation mode of the image sensor of the camera is the average pixel combination mode. The processor is configured to detect light sensitivity ISO of the image sensor in the preview state. The camera is configured to photograph the preview image when the processor determines that the light sensitivity ISO of the image sensor is greater than a preset value, where when the preview image is being photographed, the operation mode of the image sensor of the camera is the sum pixel combination mode.

According to a sixth aspect, a computer readable storage medium that stores one or more programs is provided, where the one or more programs include an instruction, and when being executed by a portable electronic device that includes a display and multiple applications, the instruction enables the portable electronic device to execute the method according to any one of the first aspect, the first to the third possible implementations of the first aspect, or the fourth aspect.

In a possible implementation, by means of analysis of luminance of at least one pixel in a preview image, detecting that a photographing environment is a low illumination scenario is implemented in the following manner. If average luminance of the at least one pixel in the preview image is less than a preset threshold, the photographing environment is considered as a low illumination scenario.

In another possible implementation, a user interface (UI) of the terminal reminds a user that a pixel combination mode is switched.

In still another possible implementation, a UI of the terminal reminds a user to turn on a low illumination photographing mode.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

FIG. 3 is a schematic diagram of a binning rule;

FIG. 4 is a schematic diagram of a ½ binning operation in a horizontal direction;

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that ordinal numbers such as "first" and "second," if mentioned in the embodiments of the present disclosure, are only used for distinguishing, unless the ordinal numbers definitely represent a sequence according to the context.

A terminal mentioned in the embodiments of the present disclosure includes an electronic device equipped with a camera, for example, a mobile phone, a tablet computer, a notebook, a wearable device, or an in-vehicle device.

Figures 1, 2:
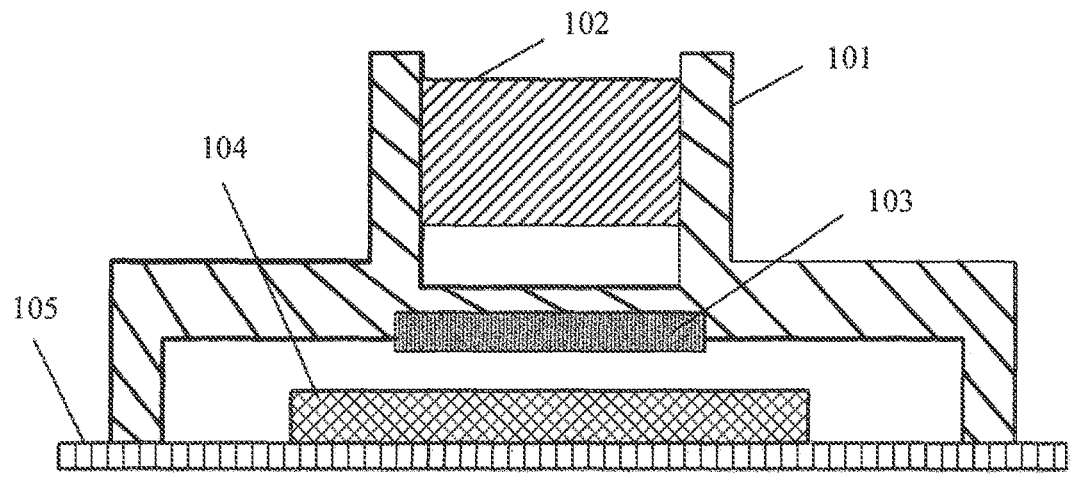
FIG. 1 is a schematic diagram of a general structure of a camera.
FIG. 2 is a schematic diagram of an arrangement mode of an image pixel in a Bayer format.

FIG. 1 is a schematic diagram of a general structure of a camera. The camera generally includes a lens cone 101, a lens 102, a color filter 103, an image sensor 104, and a circuit card 105. The image sensor 104 is a core device of the camera, the image sensor 104 may also be referred to as a light-sensitive element, and the image sensor 104 is an apparatus configured to receive light passing through the lens 102 and convert these optical signals into electrical signals. Two main types of common image sensors of the camera are a charge-coupled device (CCD) sensor and a complementary metal-oxide-semiconductor (CMOS) sensor.

Currently, the color filter 103, also referred to as a "color separation filter," mainly separates colors in two manners, a color separation method for red, green, and blue (RGB) primary colors and a color separation method for cyan, magenta, yellow, and key (black) (CMYK) complementary colors. The color filter 103 may be an infrared filter. The circuit card 105 may be a printed circuit board (PCB), and the PCB may be generally classified as a rigid board, a flexible board, or a rigid-flexible board. A different image sensor 104 uses a different type of PCB. For example, the CMOS sensor may use any one of the three types of PCBs, and the CCD sensor usually uses the rigid-flexible board.

A general operating principle of the camera is as follows. A scene is photographed using the lens 102, a generated optical image is projected onto the image sensor 104, the optical image is then converted into an electrical signal, the electric signal is then converted into a digital signal after analog-to-digital conversion is performed, and after being processed by a digital signal processor (DSP), the digital signal is further sent to a mobile phone processor for processing and is finally converted into a visible image on a mobile phone screen. The DSP may also be referred to as a DSP chip, and a function of the DSP is to perform optimization processing on a digital image signal by means of a series of complex operations based on a mathematical algorithm, and is to finally transmit a processed signal to a display. Generally, in a camera with a CMOS sensor, a DSP chip of the CMOS sensor has been integrated into the CMOS sensor, and the DSP chip and the CMOS sensor are one entity in appearance. However, a camera that uses a CCD sensor is divided into two independent parts, a CCD and a DSP.

Currently, a majority of CCD image sensors and CMOS image sensors (or referred to as light-sensitive elements) record information about three primary colors (RGB) of an image using a filter arrangement format referred to as Bayer. This pattern is obtained in an arrangement manner in which an interval row of a red-green filter and an interval row of a blue-green filter cyclically and alternately appear. Therefore, the Bayer format is a most common data output format of the CCD image sensors and the CMOS image sensors.

There are generally four modes for arranging an image pixel in the Bayer format. As shown in FIG. 2, an upper left matrix in FIG. 2 is used as an example. An odd scanning row outputs RGRG . . . , and an even scanning row outputs GBGB . . . . According to a large-area coloring characteristic indicating that bandwidth for responding by human eyes to colors is not high, each pixel does not necessarily output three colors at the same time. Therefore, during data sampling, the following manner may be used. A first, a second, a third, a fourth, . . . pixels in the odd scanning row respectively sample and output R, G, R, G, . . . data, and a first, a second, a third, a fourth, . . . pixels in the even scanning row respectively sample and output G, B, G, B, . . . data. During practical processing, an RGB signal of each pixel includes a signal of a color output by the pixel and a signal of another color output by a neighboring pixel.

Although more image transmission bandwidth and storage space can be saved in the Bayer format than a full-color format, in some cases, an image in the Bayer format still needs to be processed to further reduce an image size. Currently, binning (i.e., pixel combination) processing is a processing method for pixel combination that is directly specific to the image in the Bayer format.

Binning is an image reading method. In the method, neighboring pixels are added, or an average is calculated after neighboring pixels are added, and a sum or an average is used as a new pixel for output. A manner in which neighboring pixels are added and a sum is used as a new pixel for output is referred to as sum binning, add binning, or sum pixel combination, and a manner in which an average is calculated after neighboring pixels are added and the average is used as a new pixel for output is referred to as average binning or average pixel combination. Binning may be performed in a horizontal direction, may be performed in a vertical direction, or may be performed in both directions at the same time. In this way, the image size may be reduced, and an amount of image data may be reduced. In addition, because an average of multiple pixels is used to represent a value of a new pixel, an effect of suppressing image noise is obtained. If a sum of multiple pixels is used to represent a value of a new pixel, not only the image size may be reduced, but also luminance of the image may be increased.

Figures 3, 4:
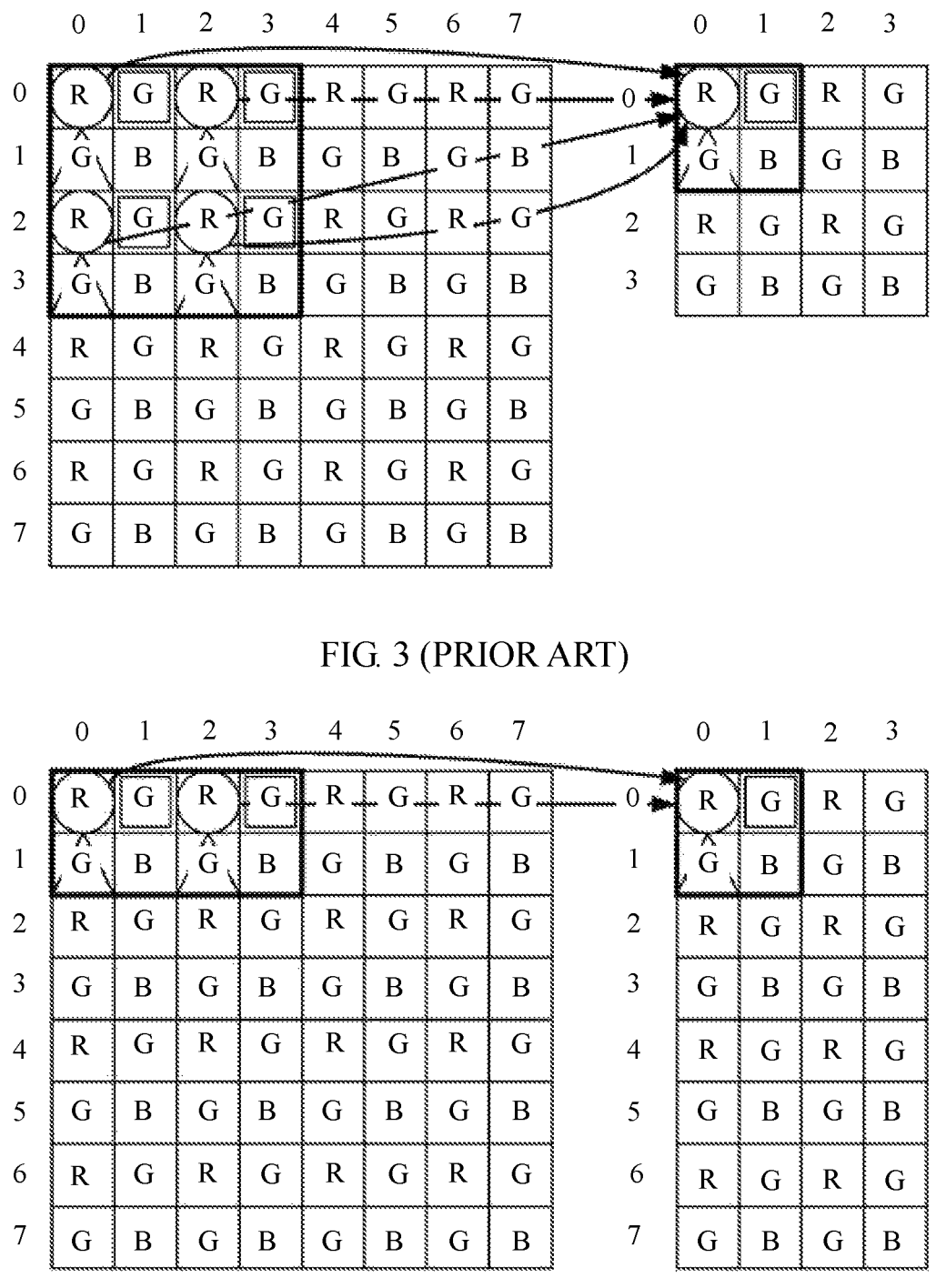

A common binning method is shown in FIG. 3. A binning rule is shown using ½ binning as an example. R, G, and B respectively represent a red pixel, a green pixel, and a blue pixel in an image in the Bayer format. An upper number and a left number in FIG. 3 respectively represent a horizontal coordinate and a vertical coordinate in order to conveniently reference the pixel. A left part of FIG. 3 is an original Bayer image output by an image sensor, and a right part of FIG. 3 is a Bayer image on which ½ binning is performed in the horizontal direction and the vertical direction. A value of a red pixel that is obtained after the binning and whose coordinates are (0, 0) is equal to an average of four pixels whose coordinates are (0, 0), (0, 2), (2, 0), and (2, 2) in the original image, that is, [R(0, 0)+R(0, 2)+R(2, 0)+R(2, 2)]/4. Correspondences between these pixels are marked by circles and arrows. Similarly, for green pixels labeled squares, green pixels labeled triangles, or blue pixels with no graph label on the left side, an average of the pixels is a value of a pixel that is obtained after the binning and that has a same label in the image on the right side. In this way, a 4×4 area is obtained after a binning operation is performed on an 8×8 area in the original image.

Similarly, the value of the red pixel that is obtained after the binning and whose coordinates are (0, 0) is equal to a sum of the four pixels whose coordinates are (0, 0), (0, 2), (2, 0), and (2, 2) in the original image, that is, [R(0, 0)+R(0, 2)+R(2, 0)+R(2, 2)]. A green pixel and a blue pixel that are obtained after the binning may be processed in a similar manner.

Following uses the sum pixel combination mode as an example to describe a binning rule in the horizontal direction and the vertical direction. A rule of the average pixel combination mode is similar to the rule of the sum pixel combination mode.

FIG. 4 shows a schematic diagram of a ½ binning operation only in the horizontal direction. A value of each pixel on the right side is a sum of two horizontally neighboring pixels in an original image on the left side, that is, a value of a first red pixel obtained after the binning is [R(0, 0)+R(2, 0)]. A horizontal size of an image obtained after the binning is ½ that of the original image, and a vertical size remains unchanged.

Figures 5, 6:
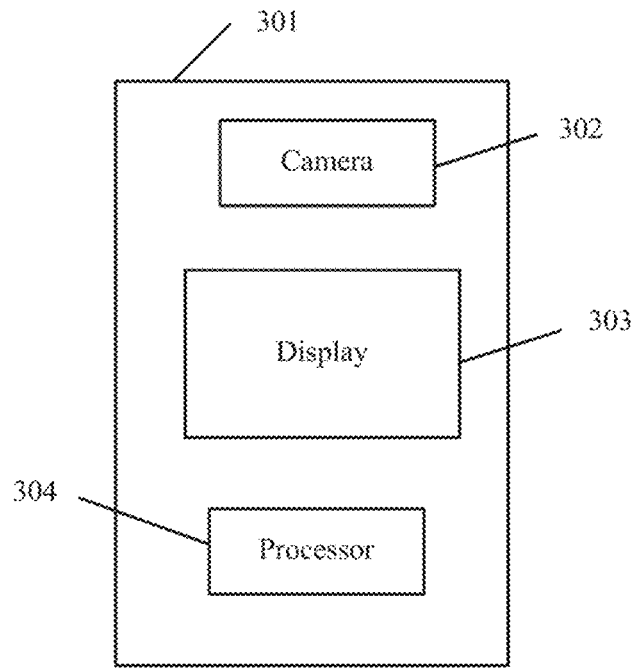
FIG. 5 is a schematic diagram of a ½ binning operation in a vertical direction.
FIG. 6 is a schematic structural diagram of a terminal according to an embodiment of the present disclosure.

FIG. 5 shows a schematic diagram of a ½ binning operation only in the vertical direction. A value of each pixel on the right side is a sum of two vertically neighboring pixels in an original image on the left side, that is, a value of a first red pixel obtained after the binning is [R(0, 0)+R(0, 2)]. A vertical size of an image obtained after the binning is ½ that of the original image, and a horizontal size remains unchanged.

A rule of binning in another proportion is the same as that of ½ binning, and an only difference is that a sum or an average of more pixels is calculated. Further, for 1/n binning in a direction, a sum or an average of n pixels is calculated, and a size that is of an image obtained after the binning and that is in the direction becomes 1/n of an original size.

Certainly, a camera may not use a pixel combination mode to photograph a picture or a video, and this photographing mode in which binning is not performed may be referred to as a normal photographing mode.

Embodiment 1

This embodiment of the present disclosure provides a photographing method, and the following uses a smartphone with a camera as an example to describe the photographing method. The method includes the following steps (not shown).

Step S201: Receive a camera turn-on instruction. The camera may be a front-facing camera or a rear-facing camera of the smartphone, and this is not limited in the present disclosure. For a camera turn-on manner, the camera may be turned on by a user by tapping a camera icon on a touchscreen, or may be turned on by double tapping a home button of the mobile phone, or may be turned on by double tapping a volume button of the mobile phone.

Step S202: Preview a preview image collected by the camera based on the received camera turn-on instruction, where in a preview state, an operation mode of an image sensor of the camera is an average pixel combination mode.

The image sensor of the camera supports at least two operation modes such as the average pixel combination mode and a sum pixel combination mode. The present disclosure constitutes no limitation on a binning (pixel combination) manner of the image sensor, the binning manner may be 1/n binning, and n is a positive integer greater than or equal to 2. A weight of each pixel when pixel combination is performed is not limited in the present disclosure.

When a preview image captured by the camera is previewed in the average pixel combination mode, an amount of image data in the preview image is decreased. In this way, not only a speed of previewing the image can be improved, but also image noise can be decreased.

Step S203: Photograph the preview image when detecting that luminance of at least one pixel in the preview image is less than a preset condition, where when the preview image is being photographed, the operation mode of the image sensor of the camera is a sum pixel combination mode.

Each pixel in the preview image has corresponding luminance, and the luminance is not related to a hue. For same luminance, the hue may be red, or may be green. A luminance value of a pixel is from 0 to 255, luminance of a pixel whose luminance value is close to 255 is relatively high, and luminance whose value is close to 0 is relatively low.

By means of analysis of the luminance of the at least one pixel in the preview image, it is detected that a photographing environment is a low illumination scenario, and the image sensor of the camera photographs the preview image in the sum pixel combination mode. A scenario in which luminance of a photographing environment is less than 30 lux may be considered as a low illumination scenario. For example, a photographing scenario such as a cinema, a pub, or a KTV may be considered as a low illumination scenario.

If there is no other auxiliary equipment, when photographing is performed in these scenarios, because light is extremely low and there is a small amount of light admitted into the camera, a clear portrait photo cannot be photographed. However, when photographing is performed in the sum pixel combination mode, because a sum of multiple pixels is used to represent a value of a new pixel, luminance of a photographed image increases, and a photographing effect in a low illumination scenario can be improved. A ½ binning mode is used as an example. A value of a new pixel is a sum of four original pixels, and a signal value is increased by approximately four times. Therefore, a problem that an image cannot be photographed in low light can be resolved.

Optionally, by means of the analysis of the luminance of the at least one pixel in the preview image, detecting that the photographing environment is a low illumination scenario may be implemented in the following manner. If average luminance of pixels in the preview image is less than a given threshold, the photographing environment is considered as a low illumination scenario. The preset condition may be a threshold, or may be a range.

Optionally, photographing the preview image includes photographing the preview image to obtain at least one of a picture or a video. The camera may photograph a static image, may photograph a dynamic image, or may photograph a mixture of a static image and a dynamic image.

Optionally, a terminal performs at least one of whitening, denoising, eye brightening, or face slimming on the photographed image such that the photographed image meets user expectation.

For example, the user uses a front-facing camera to take a self-portrait, and when light is relatively low, a relatively bright facial image may be obtained by photographing in the sum pixel combination mode. Beauty processing is performed on the image, that is, operations such as whitening, eye brightening, and face slimming are performed such that a self-portrait expected by the user can be obtained.

Optionally, in low light, photographing in the sum pixel combination mode may also be referred to as a night scene mode. When the operation mode of the image sensor is switched from the average pixel combination mode to the sum pixel combination mode, the user may be reminded that the photographing mode is switched. Alternatively, when it is detected that a photographing environment is a low light environment, the user may be reminded to manually switch the photographing mode from the average pixel combination mode to the sum pixel combination mode.

In the photographing method provided in this embodiment of the present disclosure, when it is detected that a photographing environment is a low light environment, luminance of a photographed image can be increased by photographing in a sum pixel combination mode, and a problem that an image cannot be photographed in low light can be resolved.

This embodiment of the present disclosure provides another photographing method. Determining whether a photographing environment is a low illumination scenario is implemented by detecting ISO of the image sensor, and another photographing step is similar to that in the foregoing photographing method described in the embodiment. A preview image captured by the camera is photographed when it is detected that the light sensitivity ISO of the image sensor is greater than a preset value, and when the preview image is being photographed, the operation mode of the image sensor of the camera is the sum pixel combination mode.

For the light sensitivity ISO, when exposure values are the same, if a value of an aperture is unchanged, when higher light sensitivity ISO is selected, same exposure can be obtained at a higher shutter speed. Conversely, if a shutter speed is unchanged, correct exposure can be constantly obtained using a smaller aperture. Therefore, when photographing is performed in low light, relatively high light sensitivity ISO may be usually selected. Generally, an ISO value of a mobile phone is from 200 to 1600. A preset value of the ISO may be set to 800, or may be set to 1000.

Embodiment 2

FIG. 6 is a schematic structural diagram of a terminal 301 according to an embodiment of the present disclosure. The terminal 301 includes a processor 304, a display 303, and a camera 302. The terminal 301 can execute the method in Embodiment 1. The following uses the terminal 301 that is a smartphone as an example to describe this embodiment of the present disclosure.

An image sensor of the camera 302 supports at least two operation modes such as an average pixel combination mode and a sum pixel combination mode. The present disclosure constitutes no limitation on a binning (pixel combination) manner of the image sensor, the binning manner may be 1/n binning, and n is a positive integer greater than or equal to 2. A weight of each pixel when pixel combination is performed is not limited in the present disclosure.

A user may turn on the camera 302 by tapping a camera icon on a touchscreen, or may turn on the camera 302 by double tapping a home button of the mobile phone or double tapping a volume button of the mobile phone.

After the camera 302 is turned on, the display 303 is configured to preview a preview image collected by the camera 302, where in a preview state, an operation mode of the image sensor of the camera 302 is the average pixel combination mode.

The display 303 of the mobile phone may also be referred to as a screen. Screen types are mainly an On-Cell type, an In-Cell type, and an One Glass Solution (OGS) type/a Touch on Lens (TOL) type. In-Cell is embedding a touch function into a liquid crystal pixel of a liquid crystal screen. On-Cell is a method for embedding a touchscreen into a location between a color filter substrate and a polarizer of the screen, that is, a touch sensor is configured on a liquid crystal panel. An OGS technology/a TOL technology is integrating a touchscreen with cover glass, plating a conducting layer of an Indium Tin Oxide (ITO) film on an inner side of the cover glass, and directly performing film coating and photoetching on the cover glass.

The processor 304 is configured to analyze luminance of at least one pixel in the preview image in the preview state. The processor 304 may be a single-core processor, or may be a multi-core processor.

The camera 302 is configured to photograph the preview image when the processor 304 determines that the luminance of the at least one pixel in the preview image is less than a preset condition, where when the preview image is being photographed, the operation mode of the image sensor of the camera 302 is the sum pixel combination mode.

A method for analyzing the luminance of the at least one pixel in the preview image in the preview state and a method for determining the preset condition are similar to those in the solution in Embodiment 1.

Optionally, that the camera 302 is configured to photograph the preview image includes that the camera 302 is configured to photograph the preview image to obtain at least one of a picture or a video. The camera 302 may be configured to photograph a static image, may be configured to photograph a dynamic image, or may be configured to photograph a mixture of a static image and a dynamic image.

Optionally, the processor 304 is further configured to perform at least one of whitening, denoising, eye brightening, or face slimming on the photographed image. The terminal 301 performs at least one of whitening, denoising, eye brightening, or face slimming on the photographed image such that the photographed image meets user expectation. Whitening, denoising, eye brightening, and face slimming may be beauty algorithms commonly used in other approaches, and details are not described herein.

Optionally, in low light, photographing in the sum pixel combination mode may also be referred to as a night scene mode. When the operation mode of the image sensor is switched from the average pixel combination mode to the sum pixel combination mode, the user may be reminded that the photographing mode is switched. A manner for reminding the user may be a manner of using a UI on the display 303 to remind the user. Alternatively, when it is detected that a photographing environment is a low light environment, the user may be reminded to manually switch the photographing mode from the average pixel combination mode to the sum pixel combination mode.

According to the terminal 301 provided in this embodiment of the present disclosure, when the processor 304 determines that luminance of at least one pixel in a preview image is less than a preset condition, an operation mode of an image sensor is switched to a sum pixel combination mode. For an image photographed in this mode, luminance of the photographed image can be increased, and a problem that an image cannot be photographed in low light can be resolved.

In another terminal (not shown) provided in this embodiment of the present disclosure, a processor of the other terminal is configured to detect light sensitivity ISO of the image sensor in the preview state. A camera of the other terminal is configured to photograph the preview image when the processor determines that the light sensitivity ISO of the image sensor is greater than a preset value, where when the preview image is being photographed, an operation mode of the image sensor of the camera is the sum pixel combination mode. The other terminal executes the photographing method that is in Embodiment 1 and in which photographing is performed using light sensitivity ISO to determine a photographing environment.

Selection of a preset value of the light sensitivity ISO is similar to the description in Embodiment 1.

Embodiment 3

This embodiment of the present disclosure provides a photographing apparatus (not shown), and the photographing apparatus can execute the photographing method described in Embodiment 1.

The apparatus includes a receiving unit configured to receive a camera turn-on instruction, a preview unit configured to preview a preview image collected by the camera based on the camera turn-on instruction received by the receiving unit, where in a preview state, an operation mode of an image sensor of the camera is an average pixel combination mode, and a photographing unit configured to photograph the preview image when detecting that luminance of at least one pixel in the preview image is less than a preset condition, where when the preview image is being photographed, the operation mode of the image sensor of the camera is a sum pixel combination mode.

This embodiment of the present disclosure further provides a computer readable storage medium (not shown) that stores one or more programs, where the one or more programs include an instruction, and the instruction enables the portable electronic device to execute the photographing method described in Embodiment 1 when being executed by a portable electronic device that includes a display and multiple applications.

Finally, it should be noted that the foregoing embodiments are merely intended for describing an example of the technical solutions of the present disclosure other than limiting the present disclosure. Although the present disclosure and benefits of the present disclosure are described in detail with reference to the foregoing embodiments, a person of ordinary skill in the art should understand that they may still make modifications to the technical solutions described in the foregoing embodiments or make equivalent replacements to some technical features thereof, without departing from the scope of the claims of the present disclosure.

What is claimed is:

1. An image photographing method, comprising:
   receiving, by a terminal, a camera turn-on instruction;
   previewing, by the terminal, a preview image collected by a camera of the terminal, wherein the preview image is captured using an image sensor of the camera in an average pixel combination mode;
   switching, by the terminal, from the average pixel combination mode to a sum pixel combination mode in response to luminance of at least one pixel in the preview image being less than a preset value; and
   capturing, by the terminal, the preview image, wherein the preview image is captured by capturing a second image using the image sensor of the camera in the sum pixel combination mode.

2. The image photographing method of claim 1, wherein capturing the preview image comprises capturing the preview image to obtain a still picture.

3. The image photographing method of claim 2, wherein after capturing the preview image, the image photographing method further comprises whitening on a photographed image.

4. The image photographing method of claim 2, wherein after capturing the preview image, the image photographing method further comprises denoising on a photographed image.

5. The image photographing method of claim 2, wherein after capturing the preview image, the image photographing method further comprises eye brightening on a photographed image.

6. The image photographing method of claim 2, wherein after capturing the preview image, the image photographing method further comprises face slimming on a photographed image.

7. The image photographing method of claim 1, wherein capturing the preview image comprises capturing the preview image to obtain a video.

8. The image photographing method of claim 7, wherein after capturing the preview image, the image photographing method further comprises whitening on a photographed image.

9. The image photographing method of claim 7, wherein after capturing the preview image, the image photographing method further comprises denoising on a photographed image.

10. The image photographing method of claim 7, wherein after capturing the preview image, the image photographing method further comprises eye brightening on a photographed image.

11. The image photographing method of claim 7, wherein after capturing the preview image, the image photographing method further comprises face slimming on a photographed image.

12. The image photographing method of claim 1, wherein after capturing the preview image, the image photographing method further comprises switching an operation mode of the image sensor of the camera to the average pixel combination mode.

13. The image photographing method of claim 1, wherein the average pixel combination mode comprises calculating an average of neighboring pixels and using the average as a new pixel for output, and wherein the sum pixel combination mode comprises adding the neighboring pixels and using a sum as the new pixel for output.

14. A terminal, comprising:
    a memory having instructions stored therein;
    a camera comprising an image sensor;
    a display; and
    a processor coupled to the memory, the camera, and the display, wherein the processor executes the instructions to:
        receive a camera turn-on instruction;
        preview a preview image collected by the camera of the terminal, wherein the preview image is captured using the image sensor of the camera in an average pixel combination mode;
        switch from the average pixel combination mode to a sum pixel combination mode in response to luminance of at least one pixel in the preview image being less than a preset value; and
        capture the preview image, wherein the preview image is captured by capturing a second image using the image sensor of the camera in the sum pixel combination mode.

15. The terminal of claim 14, wherein the processor further executes the instructions to capture the preview image to obtain a still picture or a video.

16. The terminal of claim 15, wherein the processor further executes the instructions to perform whitening on a photographed image.

17. The terminal of claim 15, wherein the processor further executes the instructions to perform denoising on a photographed image.

18. The terminal of claim 15, wherein the processor further executes the instructions to perform eye brightening on a photographed image.

19. The terminal of claim 15, wherein the processor further executes the instructions to perform face slimming on a photographed image.

20. An image photographing method, comprising:
    receiving, by a terminal, a camera turn-on instruction;
    previewing, by the terminal, a preview image collected by a camera of the terminal, wherein the preview image is captured using an image sensor of the camera in an average pixel combination mode;
    switching, by the terminal, from the average pixel combination mode to a sum pixel combination mode in response to a light sensitivity International Organization for Standardization (ISO) of the image sensor being greater than a preset value; and capturing, by the terminal, the preview image, wherein the preview image is captured by capturing a second image using the image sensor of the camera in the sum pixel combination mode.

* * * * *